(12) United States Patent
Yuan et al.

(10) Patent No.: US 8,456,812 B2
(45) Date of Patent: Jun. 4, 2013

(54) ELECTRONIC DEVICE HOUSING AND MANUFACTURING METHOD THEREOF

(75) Inventors: Jing-Hua Yuan, Shenzhen (CN); Zi-Ming Tang, Shenzhen (CN); Fa-Guang Shi, Shenzhen (CN); Cong-Cong Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 216 days.

(21) Appl. No.: 12/979,473

(22) Filed: Dec. 28, 2010

(65) Prior Publication Data

US 2012/0147532 A1   Jun. 14, 2012

(30) Foreign Application Priority Data

Dec. 14, 2010   (CN) .......................... 2010 1 0587317

(51) Int. Cl.
*H05K 5/00* (2006.01)
*H05K 7/00* (2006.01)
*H04M 1/00* (2006.01)

(52) U.S. Cl.
USPC ............ 361/679.01; 361/679.02; 361/679.03; 361/679.05; 361/679.55; 361/679.56; 361/679.58; 361/679.59; 455/575.1; 455/575.3; 455/575.4; 455/575.8

(58) Field of Classification Search
USPC ............. 361/679.01, 679.02, 679.08, 679.09, 361/679.3, 679.55–679.59; 455/325, 556.1, 455/550.1, 90.1, 575.1; 369/282, 291, 253, 369/44.16, 75.5
See application file for complete search history.

(56) References Cited

U.S. PATENT DOCUMENTS

| | | | | |
|---|---|---|---|---|
| 5,479,285 A | * | 12/1995 | Burke | 349/58 |
| 7,536,009 B2 | * | 5/2009 | Lee | 379/433.01 |
| 2003/0005852 A1 | * | 1/2003 | Okamura et al. | 105/396 |
| 2009/0002924 A1 | * | 1/2009 | Nakanishi et al. | 361/679 |
| 2009/0101384 A1 | * | 4/2009 | Kawasaki et al. | 174/50.5 |
| 2010/0061040 A1 | * | 3/2010 | Dabov et al. | 361/679.01 |
| 2010/0302717 A1 | * | 12/2010 | Oh et al. | 361/679.01 |

* cited by examiner

*Primary Examiner* — Zachary M Pape
*Assistant Examiner* — Jerry Wu
(74) *Attorney, Agent, or Firm* — Altis Law Group, Inc.

(57) ABSTRACT

An electronic device housing includes a bottom housing, a support frame, a display panel, and a side frame. The bottom housing includes a base plate and four sidewalls extending from a periphery of the base plate. The support frame is welded to the sidewalls of the bottom housing. The support frame is received in the bottom housing and made up of at least two support plates, two ends of each are welded to ends of the adjacent support plates. The support frame forms at least two welding lines at joints of the at least two support plates, and each welding line corresponds to a middle portion of one sidewall. The display panel is positioned on the support frame sandwiched between the support frame and the side frame. The side frame is connected to a top edge of the bottom housing.

12 Claims, 3 Drawing Sheets

ELECTRONIC DEVICE HOUSING AND MANUFACTURING METHOD THEREOF

BACKGROUND

1. Technical Field

The present disclosure relates generally to electronic device housings, and more particularly, to an electronic device housing manufactured by welding.

2. Description of Related Art

A typical electronic device housing includes a bottom housing, a side frame, and a display panel. The display panel is positioned on the side frame. The side frame includes four support boards. Two ends of each support board are joined to the ends of the adjacent support board by welding, and form welding lines therebetween at corners of the electronic device. An outer periphery of the side frame is welded to the bottom housing. However, after welding, a welding portion between the side frame and the bottom housing may generate weld marks, thus deteriorating device appearance. Moreover, upon impact, the display screen and side frame are easily damaged due to insufficient structural strength at the corners of the side frame.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
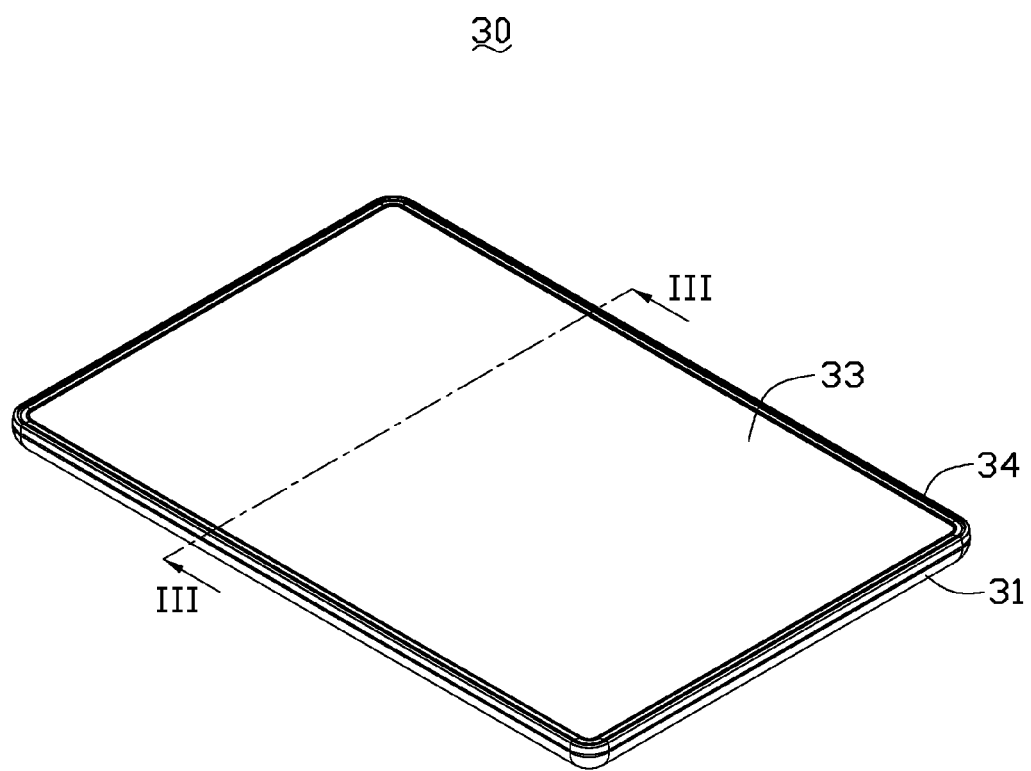
FIG. 1 is an isometric view of an embodiment of an electronic device housing.
Figure 2:
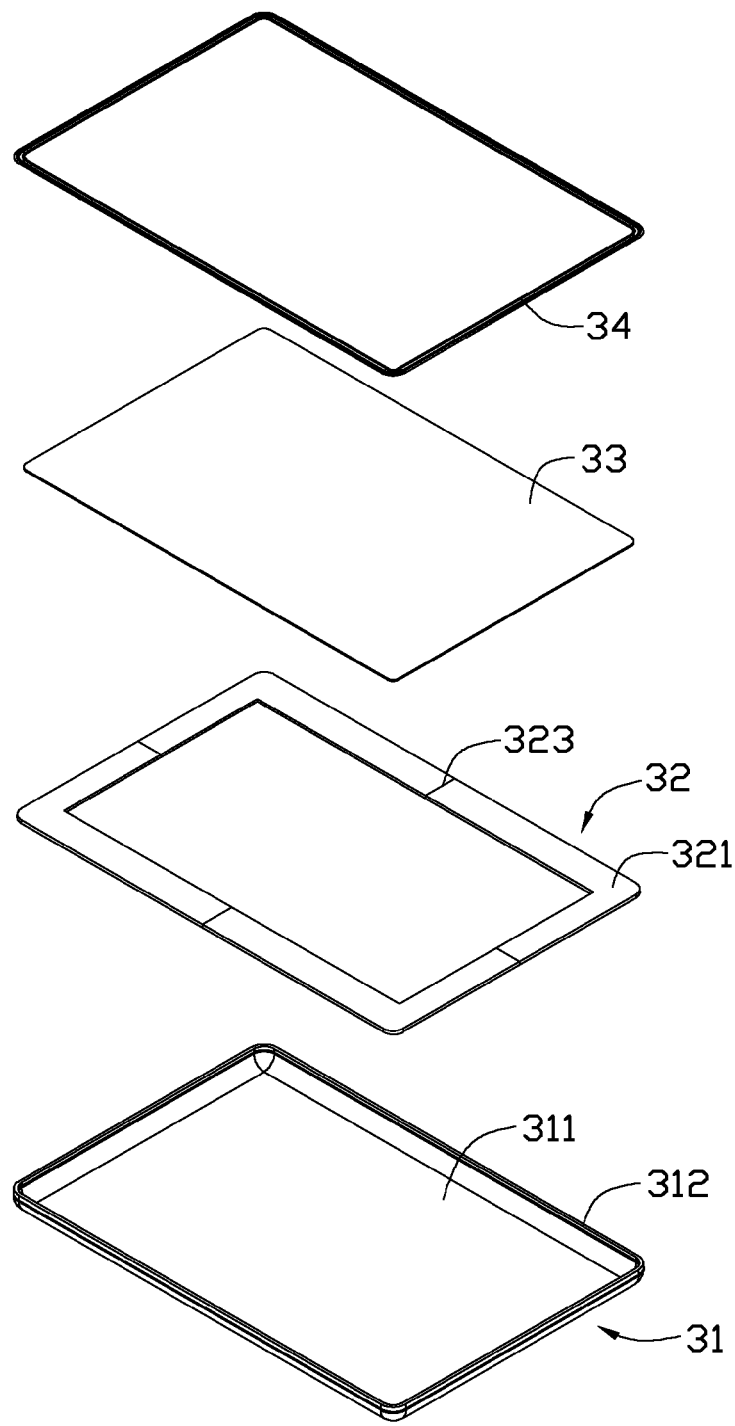
FIG. 2 an exploded, isometric view of the electronic device housing of FIG. 1 including a bottom housing, a support frame, a display panel, and a side frame.

Referring to FIG. 1 and FIG. 2, an embodiment of an electronic device housing 30 includes a bottom housing 31, a support frame 32, a display panel 33, and a side frame 34. The support frame 32 is welded in the bottom housing 31. The display panel 33 is positioned on the support frame 32. The side frame 34 is connected to a top edge of the bottom housing 31.

Figure 3:
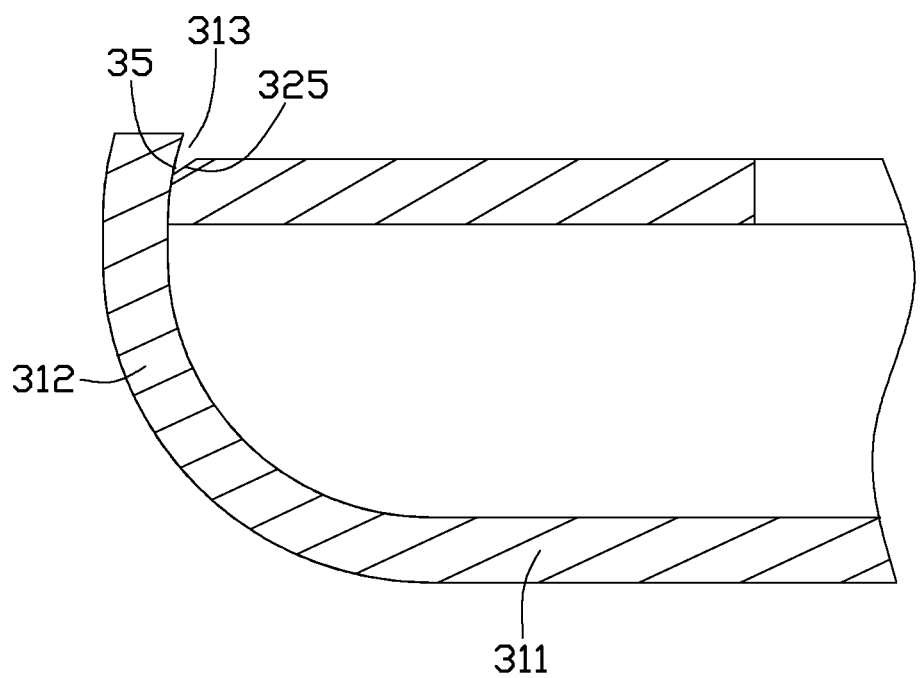
FIG. 3 is a partial cross-section of the bottom housing and the support frame of FIG. 1, taken along line III-III.

Referring also to FIG. 3, the bottom housing 31 includes a base plate 311 and four sidewalls 312. The base plate 311 is substantially rectangular. Each sidewall 312 is a curved wall and extends from a periphery of the base plate 311. An end of each sidewall 312 away from the base plate 311 extends inward such that ends of the four sidewalls 312 cooperatively define a neck 313 (see FIG. 3). In the illustrated embodiment, the bottom housing 31 is metal such as aluminum, magnesium, or their alloys.

The support frame 32 is substantially a rectangular frame and securely received in the bottom housing 31. The supporting frame 32 includes at least two support plates 321. In the illustrated embodiment, the support frame 32 includes four support plates 321. Each of the support plates 321 is substantially L-shaped. Two ends of each support plate 321 are welded to the ends of the adjacent support plates 321, respectively. As a result, the support frame 32 forms four welding lines 323 at joints of the four support plates 321, and each welding line 323 corresponds to a middle portion of one sidewall 312. It should be pointed out that the support frame 32 may include two or more support plates 321 rather than four, such as two support plates 321 which are U-shaped, as long as each welding line 323 is at a middle portion of one sidewall 312 of the support frame 32. Referring to FIG. 3, each support plate 321 forms an angled portion 325 in an edge thereof adjacent to the sidewall 312. The support frame 32 is metal such as aluminum.

The display panel 33 is a touch panel. The side frame 34 is substantially rectangular in this embodiment. The side frame 34 is plastic.

A manufacturing method for the electronic device housing 30 is as follows. First, the bottom housing 31, four support plates 321, the display panel 33, and the side frame 34 are provided. Four support plates 321 are then positioned in the bottom housing 31 from the neck 313, the ends of each resist the ends of the adjacent support plates 321, and a connecting portion of two adjacent support plates 321 correspond to the center of one sidewall 312. The connecting portions of the support plates 321 are welded by a laser (not shown) to form the supporting frame 32, thereby forming a receiving groove 35 (see FIG. 3) between the sidewalls 312 of the bottom housing 31 and the angled portions 322 of the support plates 321. A connecting portion of the bottom housing 31 and the support frame 32 is welded by a laser (not shown) along a transverse axis of the support frame 32, in which some welding slag will fill in the receiving groove 35. The connecting portion of the bottom housing 31 and the support frame 32 is then milled by a cutter (not shown). Finally, the display panel 33 is positioned on the support frame 32 and the side frame 34 is adhered to the top edge of the bottom housing 31, such that the display panel 33 is sandwiched between the support frame 32 and the side frame 34.

The support frame 32 is welded in the bottom housing 31 so the electronic device housing 30 exhibits a favorable appearance. The display panel 33 is positioned between the support frame 32 and the side frame 34, and the side frame 34 can form a decorative pattern.

The four support plates 321 are positioned in the bottom housing 31 through the neck 313. The four support plates 321 are then welded together to form the support frame 32 received in the bottom housing 31 and larger than the neck 313, which is thereby capable of being manufactured together with the bottom housing 31, simplifying manufacture of the electronic device housing 30.

When the electronic device housing 30 is subjected to external force, for example, a drop, four corners of the electronic device housing 30 absorb more external force, such that the force on the welding lines 323 is relative small, thereby protecting the support frame 32 and the display panel 33 from damage.

It should be appreciated that the support plates 321 may be first welded to the sidewalls 12 at the same height, then welded together to form the support frame 32. In addition, cushion blocks may be positioned between the support frame 32 and the display panel 33, thereby preventing the display panel 33 from damage by external force.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device housing, comprising:
   a bottom housing comprising a base plate and four sidewalls extending from a periphery of the base plate;

a support frame welded to the sidewalls of the bottom housing, wherein the support frame is received in the bottom housing and made up of at least two support plates, two ends of each support plate are welded to ends of the adjacent support plates, the support frame forms at least two welding lines at joints of the at least two support plates, and each welding line corresponds to a middle portion of one of the sidewalls;

a display panel positioned on the support frame; and a side frame, connected to a top edge of the bottom housing, the display panel sandwiched between the support frame and the side frame.

2. The electronic device housing of claim 1, wherein the support frame is welded to the bottom housing by a laser.

3. The electronic device housing of claim 1, wherein the support frame forms an angled portion in an edge connected to the sidewalls of the bottom housing.

4. The electronic device housing of claim 1, wherein an end of each sidewall away from the base plate extends inward, such that ends of the four sidewalls cooperatively defines a neck.

5. The electronic device housing of claim 1, wherein the side frame is adhered to a top edge of the bottom housing.

6. The electronic device housing of claim 1, wherein the bottom housing and the support frame are made of metal.

7. The electronic device housing of claim 1, wherein the side frame is made of plastic material.

8. A method for manufacturing an electronic device housing, comprising:

providing a bottom housing, at least two support plates, and a side frame, the bottom housing comprising a base plate and a plurality of sidewalls extending from a periphery of the base plate;

positioning the at least two support plates in the bottom housing, ends of each support plate resisting ends of the adjacent support plates, and connecting portions of two adjacent support plates correspond to a middle portion of one of the sidewalls;

welding the connecting portions of two adjacent support plates to from a support frame, and welding a connecting portion of the sidewalls and the support frame by a laser along a transverse axis of the support frame;

milling the connecting portion of the sidewalls and the support frame, providing a display panel, positioning the display panel on the support frame sandwiched between the support frame and the side frame, and adhering the side frame to a top edge of the bottom housing.

9. The method of claim 8, wherein an end of each sidewall away from the base plate extends inward, such that ends of the four sidewalls cooperatively defines a neck.

10. The method of claim 8, wherein the support frame forms an angled portion in an edge connected to the sidewalls of the bottom housing, thereby forming a receiving groove between the bottom housing and the angled portion of the support frame such that during welding, some welding slag is filled in the receiving groove.

11. The method of claim 8, wherein the bottom housing and the support frame are made of metal.

12. The method of claim 8, wherein the side frame is plastic.

* * * * *